May 18, 1954
J. J. LUGERT
2,678,586
THERMOSETTING OPTICAL CEMENT, OPTICAL ELEMENT, AND
METHOD OF MAKING OPTICAL ELEMENTS
Filed June 6, 1951
POLYMERIZED DIALLYL PHENYL PHOSPHONATE
AND CHLORINATED DIPHENYL
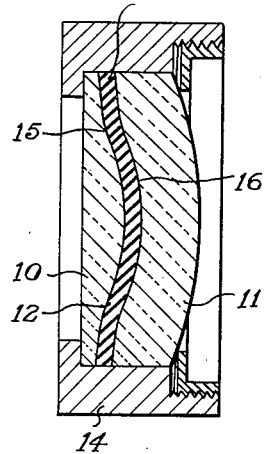
JOHN J. LUGERT
*INVENTOR.*
BY Daniel I. Mayne
Joe Allen Jones
ATTORNEYS Patented May 18, 1954

2,678,586

UNITED STATES PATENT OFFICE 2,678,586

THERMOSETTING OPTICAL CEMENT, OPTICAL ELEMENT, AND METHOD OF MAKING OPTICAL ELEMENTS

John J. Lugert, Rochester, N. Y., assignor to Eastman Kodak Company, Rochester, N. Y., a corporation of New Jersey Application June 6, 1951, Serial No. 230,114

6 Claims. (Cl. 88—57)

This invention relates to an optical cement, an optical element utilizing the cement, and a method of making optical elements particularly adapted for utilizing the new cement.

In cementing together lens components, it is desirable to use a cement which is clear, has high adhesive strength and durability characteristics, has a desirable degree of elasticity, has low shrinkage, and is stable over a long period of time. The cement should also be substantially immune to the effects of variations in temperature during use of optical elements utilizing the cement, and this is particularly essential and difficult to obtain to a sufficient degree in the case of optical instruments intended for aircraft use, where temperatures may range from $-85°$ F. to $+180°$ F. Drastic humidity conditions must also be withstood, and a good test of this quality of a cement is exposure to 95% relative humidity at 130° F. for two consecutive weeks.

In the cementing of a lens component having an aspheric lens surface, it is important that the cement have an index of refraction very close to the index of the component, for the relatively low degree of polish conveniently obtainable on such surfaces then has a negligible effect on the functioning of the lens. It is particularly desirable that the cement have an index of refraction of about 1.6, for it may then be used to good effect with lens elements where the refractive indexes of two cemented components are about 1.5 and 1.7, respectively. In such an arrangement, cement with a 1.6 index is practically ideal from the viewpoint of producing a doublet of maximum transmission. In instruments having many components, the transmission of each component is of course important.

It is also desirable that lens cements have the properties of high adhesion during lens alignment while still remaining sufficiently workable, prior to becoming set, to permit aligning of lens components joined by the cement. Of particular convenience is a cement which can receive a preliminary setting treatment while optical components are positively held in a desired relation, and can thereafter hold the components in this relation, as for example during completion of setting after removal of the components from an aligning fixture.

I have found that all of the above-described desirable attributes are provided by an optical cement made up essentially of diallyl phenyl phosphonate and chlorinated diphenyl, with a suitable polymerization catalyst such as benzoyl peroxide. This cement permits manufacture of a lens element in the manner described, and lens elements utilizing the new cement have for the first time the desirable properties which have been discussed above, regardless of the configurations of the optical surfaces.

Accordingly, the objects of the invention include the provision of a new lens cement, a new optical element utilizing the cement, and a new method of making an optical element which makes use of the desirable properties of the new cement.

The above and other objects of the invention will become apparent from a study of the following specification and claims, when read in conjunction with the accompanying drawing, in which the figure shows a cross section of a doublet lens utilizing the new cement and mounted in an aligning fixture.

In the figure are shown two optical components 10 and 11 joined together by a cement 12 and mounted in an aligning fixture which has been shown in a more-or-less diagrammatical manner at 14. The lenses 10 and 11 are shown with facing aspheric surfaces 15 and 16, although it is to be understood that the cement of the invention is also applicable for joining optical components of other types and for general optical use.

As explained above, the new cement has particular utility in cementing to an aspheric lens surface because of the high refractive index of the cement. Since it is difficult to obtain a high degree of polish on aspheric surfaces, a compromise low degree of polish is rendered acceptable if the cement has approximately the same index as the lens.

The cement which has been found to have such greatly improved properties over previously-known cements comprises a mixture of diallyl phenyl phosphonate and a chlorinated diphenyl, the latter being marketed under the name "Arochlors" by the Monsanto Chemical Company. A polymerization catalyst comprising benzoyl peroxide is preferably used in the mixture in a minor proportion, although other suitable catalysts such as tertiary butyl perbenzoate can also be used.

Of the "Arochlors", numbers 1242, 1248, 1254 and 1262 have been found to provide successful results, but number 1260 has been found to be best.

According to one embodiment of the invention, a mixture of about 50% diallyl phenyl phosphonate and 50% chlorinated diphenyl is made up, with benzoyl peroxide present in the mixture in the proportion of about 3% by weight. After preparing the mixture, a small amount is poured on one optical component, the other component is placed in position, and the cement is uniformly distributed between the two components by pressing and by working the components with a rotary and back-and-forth motion. The assembly is then placed in a suitable fixture such as 14 to accomplish the desired optical alignment and is then placed in an oven at about 70° C. for about 1½–3 hours to accomplish prepolymerization of the cement. The prepolymerization is followed by further polymerization at about 71–93° C. (160–200° F.) for up to 40 hours.

The final polymerization time depends on the temperature and factors peculiar to the individual lens being made, such as thickness of the lens, etc. At 160° F., the time may run to 40 hours, while at 180° F., 24 hours would be sufficient. At the maximum temperature, 200° F., an even shorter time could be used.

In a second manner of practicing the invention, a mixture of 75% diallyl phenyl phosphonate and 25% chlorinated diphenyl is catalyzed and used in the manner set forth in the preceding example.

According to a third mode of practicing the invention, a 50–50 mixture is made up and the lenses assembled and placed in a fixture in accordance with the first embodiment, followed by heating at about 70° C. as in the first example until the cement mixture is gelled. The cemented optical components are then removed from the aligning fixture and final polymerization carried out as explained above. The cement is sufficiently firm after the preliminary gelling to hold the components safely in alignment during the final heating. This manner of using the cement can also be used with the 75–25 mixture of the second example.

Of the two mixtures recited, both give highly satisfactory and improved cements, but the mixture containing the two principal components in approximately equal proportions is superior. However, variations of about 5% from the preferred proportions do not change substantially the properties of the cement.

The new cement has a refractive index of about 1.6, and when used with lenses 10 and 11 having indexes of refraction of about 1.5 and 1.7, respectively, the cement has particular utility. Its usefulness is, however, not limited to use in such a combination of lenses, since the many other desirable properties set forth above and possessed by this cement render it highly useful as a general purpose optical cement.

While it is unnecessary to set forth the theory of operation of the invention, it appears that the strength and durability of the new cement is probably due to the polymeric diallyl phenyl phosphonate component. The chlorinated diphenyl apparently contributes to the adhesive properties of the cement to a considerable degree. The combination of the two components of the cement is so balanced that the cement has all of the desirable and difficult-to-obtain properties pointed out in the opening portions of this specification, and by the provision of all of these properties in the proper balance in a single cement, the invention provides an immense step forward in the lens cement art.

I make no claim to being the first to polymerize diallyl phenyl phosphonate, as this is described in U. S. Patent 2,497,637. Chlorinated biphenyl has been used previously in a lens cement in U. S. Patent 2,438,953.

It is to be understood that the examples which have been given herein have been stated in an illustrative sense and the invention is not to be considered as limited thereto. Rather, it is intended that the patent cover all the variations of the invention coming within the inventive concept as described in the appended claims.

I claim:

1. An optical cement comprising diallyl phenyl phosphonate, chlorinated diphenyl and a polymerization catalyst.

2. A method of making an optical element having at least two components provided with optical surfaces, comprising assembling said components with a cement comprising diallyl phenyl phosphonate, chlorinated diphenyl and a polymerization catalyst between and in contact with said surfaces, and then heating the assembly to polymerize the cement, said heating being carried out initially at about 70° for 1½–3 hours followed by further heating at about 71–93° for up to 40 hours.

3. A method according to claim 2, wherein the cemented components are placed in an aligning fixture before polymerization of the cement, and the cement is polymerized by said heating while said components are in said fixture.

4. A method according to claim 3, wherein said cement is partly polymerized by said initial heating while said components are held in said aligning fixture, and the components are then removed from the fixture and the polymerization completed by said further heating.

5. An optical cement comprising diallyl phenyl phosphonate and chlorinated diphenyl in equal parts by weight, and a polymerization catalyst.

6. An optical cement comprising about 75 parts by weight of diallyl phenyl phosphonate, about 25 parts by weight of chlorinated diphenyl, and a polymerization catalyst.

References Cited in the file of this patent

UNITED STATES PATENTS

| Number | Name | Date |
| --- | --- | --- |
| 1,267,014 | Tillyer | May 21, 1918 |
| 1,560,168 | Laabs | Nov. 3, 1925 |
| 2,092,789 | Tillyer | Sept. 14, 1937 |
| 2,211,689 | Dittmar | Aug. 13, 1940 |
| 2,382,660 | Penberthy | Aug. 14, 1945 |
| 2,393,842 | Townsley | Jan. 29, 1946 |
| 2,409,633 | Kropa | Oct. 22, 1946 |
| 2,438,953 | Thuline et al. | Apr. 6, 1948 |
| 2,443,736 | Kropa | June 22, 1948 |
| 2,445,535 | Parsons | July 20, 1948 |
| 2,445,536 | Parsons | July 20, 1948 |
| 2,453,665 | Kropa | Nov. 9, 1948 |
| 2,453,666 | Kropa | Nov. 9, 1948 |
| 2,497,637 | Toy | Feb. 14, 1950 |